US006891533B1

(12) United States Patent
Alcorn et al.

(10) Patent No.: US 6,891,533 B1
(45) Date of Patent: May 10, 2005

(54) COMPOSITING SEPARATELY-GENERATED THREE-DIMENSIONAL IMAGES

(75) Inventors: Byron A Alcorn, Ft Collins, CO (US); Jon L Ashburn, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/547,065

(22) Filed: Apr. 11, 2000

(51) Int. Cl.[7] .............................................. G06T 15/00
(52) U.S. Cl. ...................................................... 345/419
(58) Field of Search ................................ 349/419, 420, 349/418, 422, 423

(56) References Cited

U.S. PATENT DOCUMENTS

| | | | | |
|---|---|---|---|---|
| 4,660,157 A | * | 4/1987 | Beckwith et al. ............ | 345/421 |
| 4,885,703 A | | 12/1989 | Deering ....................... | 364/522 |
| 5,760,781 A | | 6/1998 | Kaufman et al. ............ | 345/424 |
| 5,831,640 A | * | 11/1998 | Wang et al. ................. | 345/552 |
| 6,342,884 B1 | * | 1/2002 | Kamen et al. ............... | 345/423 |
| 6,518,974 B2 | * | 2/2003 | Taylor et al. ................ | 345/582 |
| 6,700,588 B1 | * | 3/2004 | MacInnis et al. ............ | 345/629 |

* cited by examiner

Primary Examiner—Phu K. Nguyen

(57) ABSTRACT

Methods and apparatus for compositing separately generated three-dimensional images in a two-dimensional graphics imaging pipeline of a computer graphics system to ultimately render a composited image on a display screen. The computer graphics system includes generally a graphics library and graphics hardware together defining the imaging pipeline, and a graphics application program invoking operations in the imaging pipeline through an application program interface provided by the graphics library. The imaging pipeline may be the only pipeline in the graphics system or it may be part of a larger rendering pipeline that also includes a geometric pipeline that generates two-dimensional images represented by pixel data. The graphics system also includes a frame buffer for storing pixel data to be displayed on the display device. The image compositing module performs depth testing and stencil testing on specific components of the next image that are separately and sequentially processed by the imaging pipeline. The stencil test is performed to determine initially which image is to be rendered at each pixel. An indication of the selected image is stored in a memory location associated with that pixel. The imaging pipeline writes to the frame buffer color data either the stored or next image based on the selected image indications.

28 Claims, 7 Drawing Sheets

COMPOSITING SEPARATELY-GENERATED THREE-DIMENSIONAL IMAGES

BACKGROUND OF THE INVENTION

1. Field of the Invention

The present invention relates generally to computer graphics systems and, more particularly, to methods and apparatus for compositing three-dimensional images in a computer graphics pipeline.

2. Related Art

Computer graphics systems are commonly used for displaying two- and three-dimensional graphics representations of objects on a two-dimensional display screen. Current computer graphics systems provide highly detailed representations and are used in a variety of applications.

In a typical computer graphics system, an object to be represented on the display screen is broken down into graphics primitives. Primitives are basic components of a graphics display and may include, for example, points, lines, quadrilaterals, triangle strips and polygons. Typically, a hardware/software scheme is implemented to render, or draw, the graphics primitives that represent a view of one or more objects on the display screen.

Generally, the primitives of a three-dimensional object to be rendered are defined by a graphics application residing on a host computer in terms of primitive data. For example, when the primitive is a triangle, the host computer may define the primitive in terms of the X, Y, Z and W coordinates of its vertices, as well as the red, green, blue and alpha (R, G, B and A) color values of each vertex. Additional primitive data such as texture mapping data may be used in some applications. Rendering hardware interpolates the primitive data to dtermine the display screen pixels that represent each primitive, and the R, G and B color values for each pixel.

The basic components of a computer graphics system typically include a computer graphics library that contains software routines that control graphics hardware in response to function calls issued by the graphics application. The graphics hardware may include, for example, a geometry accelerator, a rasterizer, a frame buffer controller and a frame buffer. The system may also include other hardware such as texture mapping hardware. The geometry accelerator receives from the graphics application primitive data that defines the primitives that make up the view of the object to be displayed, referred to herein as the "model view". The geometry accelerator performs transformations on the primitive data and performs such functions as lighting, clipping and plane equation calculations for each primitive. The output of the geometry accelerator, referred to as rendering data, is used by the rasterizer and the texture mapping hardware to generate final screen coordinate (X,Y) and color data (R,G,B,A) for each pixel, collectively referred to herein as pixel data.

Texture mapping permits objects to be displayed with improved surface detail. Texture mapping involves mapping a source image, refered to as a texture, onto the surface of a three-dimensional object. Thereafter, the textured three-dimensional object is projected on the two-dimensional display screen to display the resulting image. Texture mapping involves applying one or more point elements (texels) of a texture to each point element (pixel) of the object image. The pixel data from the rasterizer and the pixel data from the texture mapping hardware are combined and stored in the frame buffer for subsequent display on the display screen.

The graphics library typically provides an application program interface (API) to enable graphics applications executing on the host computer to control efficiently the graphics hardware. Commonly, the OpenGL® standard is utilized to provide a graphics library API to the graphics system. (OpenGL is a registered trademark of Silicon Graphics, Inc.). The OpenGL standard provides a complete library of low-level graphics manipulation commands for describing models of three-dimensional objects (the "GL" of OpenGL refers to "graphics library"). This standard was originally based on the proprietary standards of Silicon Graphics, Inc., and was later transformed into an open standard now used in high-end graphics workstations and, more recently, in high-end personal computers. The OpenGL standard is described in the "OpenGL Programming Guide", version 1.1 (1997), the "OpenGL Reference Manual", version 1.1 (1997), and the "OpenGL Specification", version 1.1 (1997), all of which are hereby incorporated by reference in their entirety.

The OpenGL software interface provides specific commands that are used to specify objects and operations to produce interactive graphics systems. OpenGL is a streamlined, hardware-independent interface designed to be implemented on many different hardware platforms. As such, in computer systems that support OpenGL, the operating systems and graphics applications can make function calls to the computer graphics system according to the standardized API without knowledge of the underlying hardware configuration.

Various techniques have been employed to improve the performance of graphics systems. Due to the large number of at least partially independent operations that are performed to render a graphics image, proposals have been made to use some form of parallel architecture for graphics systems. One common approach to achieving parallelism in computer graphics processing is a technique known as pipelining. In a pipelined architecture, individual processing stages are, in effect, connected in series in an assembly-line configuration. One processing stage performs a first set of operations on one set of data and passes that data along to another processing stage. This next processing stage performs a second set of operations while at the same time the first processing stage performs again the first set of operations on another set of data.

The graphics library is typically logically divided into software routines that are accessible through the API and perform various operations, and device-specific software routines that control specific graphics hardware components. Together, the device-specific software routines and the graphics hardware components define what is commonly referred to as a graphics rendering pipeline.

There are two paths through a rendering pipeline, one for primitive data and one for pixel data. The former path processes three-dimensional (3D) primitive data to form a two-dimensional (2D) image for display on a 2D display screen. The latter path manipulates pixels, images and bitmaps of existing 2D images. The Cartesian coordinates of an image include X and Y coordinates corresponding to the pixel address in the horizontal and vertical dimensions of the display screen, and the Z coordinate which is orthogonal to the display screen and represents the distance from the location of the viewer, referred to as the viewpoint. The former path is referred to herein as a 3D pipeline due to the inclusion of depth information (Z coordinate data) in the primitive data. In contrast, the latter path is referred to as a 2D pipeline due to the absence of Z coordinate data from the 2D image data. This is because only the address (X,Y coordinate) and color (R,G,B,A) data is required to display a 2D image on a 2D display screen.

When rendering a scene comprised of multiple model views, the geometric pipeline processes the model views concurrently to properly form a realistic scene. The geometric pipeline renders the model views such that when multiple objects are to be rendered at the same pixel location, the pixel is rendered in the color of the object that is closest to the viewer. To make such a determination Z coordinate information is required to be included in the primitive data for each object, and the geometric pipeline must include the requisite components to perform the necessary comparison operations. For example, an OpenGL geometric pipeline includes a depth buffer to store Z coordinate data, and a depth test module to perform the requisite comparison operations.

It is often desirable to composite (combine) images that are not rendered concurrently. For example, pixel data for an image may be stored to a computer-readable file for future restoration during another session or on a graphics system different than the graphics system in which the image was created. Another example is when images from different sources are brought together on a graphics system to form a single, integrated image. These images may have been generated at some prior time using a graphics geometric pipeline or through some other known technique such as through image scanning. Unfortunately, conventional geometric pipelines cannot be used to perform such compositing operations because the separate images are defined by primitive data, not primitive data. In addition, the images are generated separately and, therefore, cannot be processed concurrently through the geometric pipeline. Nor can conventional imaging pipelines be used. Existing imaging pipelines are not designed to process depth information since Z coordinate data is not available in 2D pixel data which the imaging pipeline is designed to process. Therefore, separately-generated 3D images cannot be composited using conventional rendering pipelines. Accordingly, it is desirable to provide a method and apparatus to composite one or more separately generated 3D images using a graphics rendering pipeline regardless of the location, relative timing and method utilized to generate the images.

SUMMARY OF THE INVENTION

The present invention is directed to methods and apparatus for compositing three-dimensional (3D) images in a two-dimensional (2D) graphics imaging pipeline of a computer graphics system to ultimately render a composited image on a display screen. The computer graphics system includes generally a graphics library and graphics hardware together defining the imaging pipeline, and a graphics application program invoking operations in the imaging pipeline through an application program interface provided by the graphics library. Advantageously, the present invention composites three-dimensional images that are not rendered concurrently; that is, separately generated three-dimensional images.

A number of aspects of the invention are summarized below, along with different embodiments that may be implemented for each of the summarized aspects. It should e understood that the embodiments are not necessarily inclusive or exclusive of each other and may be combined in any manner that is non-conflicting and otherwise possible. It should also be understood that these summarized aspects of the invention are exemplary only and are consider to be non-limiting.

In one aspect of the invention, a graphics system is disclosed. The graphics system includes a two-dimensional graphics imaging pipeline constructed and arranged to manipulate two-dimensional (2D) images and to composite separately generated three-dimensional (3D) images. Typically, the images are represented by pixel data. The imaging pipeline may be the only pipeline in the graphics system or it may be part of a larger rendering pipeline that also includes a geometric pipeline that processes 3D primitive data to generate two-dimensional images. In such embodiments, the imaging pipeline preferably performs image compositing operations utilizing operational components of the geometric pipeline. In one embodiment, the imaging pipeline performs depth test and stencil test operations to composite the stored and next images.

In one embodiment, the imaging pipeline processes portions of the next image separately and sequentially. Initially, a depth test is performed to determine which 3D image is to be rendered at each pixel. An indication of the selected 3D image is stored in a memory location associated with that pixel. In a subsequent processing of the next image, imaging pipeline writes to the frame buffer color data either of the stored or next image based on the selected image indications. Thus, the next image is passed through or processed by the imaging pipeline twice to composite it with a stored image using a 2D imaging pipeline.

In another aspect of the invention, a graphics system including a graphics application controlling a 2D imaging pipeline is disclosed. The application controls the pipeline to composite a first 3D image and a second 3D image generated separately than the first image. The pipeline processes Z coordinate data of the images to determine, for each pixel in the composited image, which of the first or second image is closest to a viewpoint. Then, the pipeline causes color data of the closest image to be stored in a frame buffer for subsequent rendering on a display device.

In a further aspect of the invention, a method for compositing 3D images in a 2D imaging pipeline to form a composited 3D image is disclosed. The method includes a first step of storing in a frame buffer a stored 3D image including, for each pixel, color data and Z coordinate data. This is followed by a step of comparing, for each pixel in the composited image, Z coordinate data of the stored image and a next image to determine whether the stored or next image is to be rendered in the composited image. A step of replacing the color data of the stored image with color data of the next image when the next image is to be rendered at a pixel in the composited image is then performed. The available data channel may be a color data channel.

In one embodiment, the imaging pipeline consists of a color data channel and an address data channel. Here, replacing the stored color data includes coupling selectively the color data channel to a depth test module. The step of transferring Z coordinate data may include selecting the color data channel of the imaging pipeline to provide the next image Z coordinate data for the depth testing; and transferring the next image Z coordinate data over the color data channel.

In a still further aspect of the invention, a method for forming a composited image is disclosed. The method includes compositing a stored and a next 3D image in a 2D graphics imaging pipeline configured to manipulate 2D images represented by X,Y address and color data. The method includes a first step of storing the stored image in a frame buffer of the imaging pipeline, wherein the stored image includes color data and Z coordinate data. An additional step of processing successively portions of the next image data through the imaging pipeline to select, for each pixel, which of the next or stored image is closest to a viewpoint, and ultimately saving color a of the selected image to the frame buffer.

In another aspect of the invention, a graphics system including an imaging pipeline configured to manipulate two-dimensional images and to composite separately generated three-dimensional images is disclosed. The graphics system includes an image compositing module configured to perform depth testing and stencil testing on specific components of a stored and next image. The depth test is performed to first determine which of the stored and next image is to be rendered at each pixel based on Z coordinate data of the two images. The results of this first determination are utilized during a second processing of the next image data to determine subsequent writing of color data of the composited image to the frame buffer. The first determination is performed on Z coordinate data of the stored and next images while the second determination is performed on color data of the next image.

Various embodiment of the present invention provide certain advantages and overcome certain drawbacks of the above and other conventional techniques. Not all embodiments of the present invention share the same advantages and those that do may not share them under the same or similar circumstances. Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The present invention is pointed out with particularity in the appended claims. The above and further features and advantages of this invention may be better understood by referring to the following description when taken in conjunction with the accompanying drawings, in which:

DETAILED DESCRIPTION

I. Exemplary Graphics System Environment

A. System Architecture

Figure 1A:
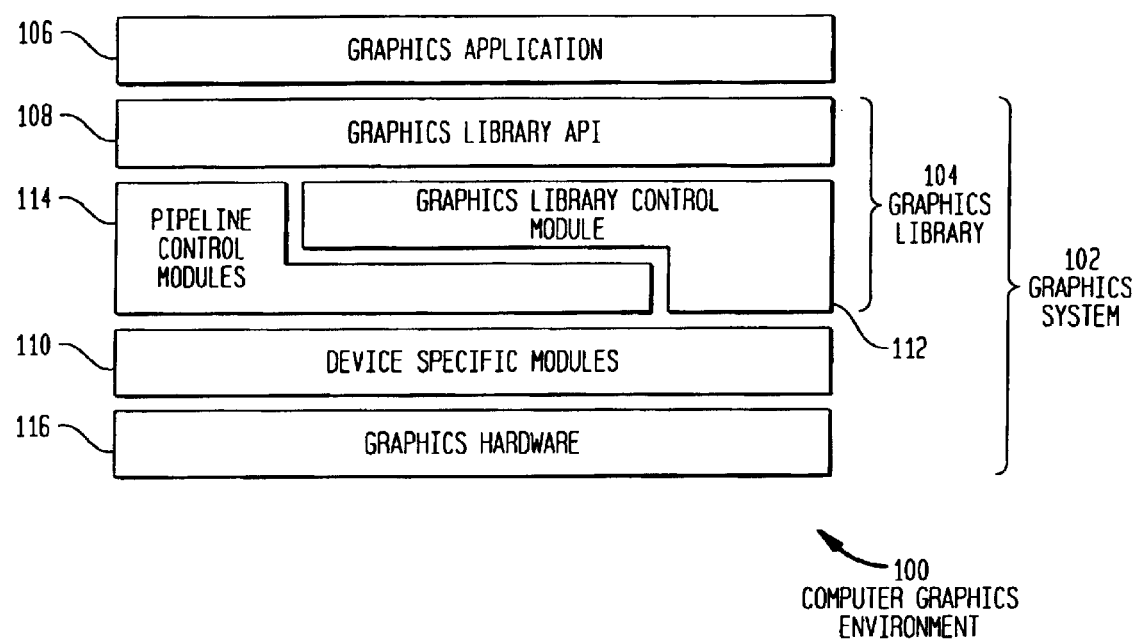
FIG. 1A is an architectural block diagram of an exemplary computer graphics system suitable for incorporation of the image compositing system and methodology of the present invention.

FIG. 1A is an architectural block diagram of an exemplary computer graphics environment 100 suitable for incorporation of the image compositing apparatus and methodology of the present invention. As shown, a graphics system 102 provides a computer platform on which software applications such as graphics application 106 execute. Graphics system 102 communicates with and is responsive to graphics application 106. Computer graphics system 102 includes a graphics library 104 and device-specific modules 10 through which graphics application 106 controls graphics hardware 116.

Graphics library 104 provides an application program interface (API) 108 of function calls through which graphics application 106 communicates with graphics library 104. Graphics library API 108 enables graphics application 106 to control efficiently graphics system 102. Graphics library API 108 is preferably a streamlined, hardware-independent interface designed to be implemented on many different computer platforms of which graphics system 102 is just one example. In graphics environment 100, graphics library 104 provides specific function calls that are used to specify objects and operations to produce interactive, three-dimensional applications. As such, graphics application 106 issues function calls to computer graphics system 102 according to the specifications defined by API 108 without knowledge of the configuration of the underlying graphics hardware 1116.

In one embodiment, graphics library API 108 is an OpenGL® API which provides a graphics library of low-level graphics manipulation commands for describing models of three-dimensional objects. The OpenGL standard is described in the "OpenGL Programming Guide," version 1.1 (1997), the "OpenGL Reference Manual," version 1.1 (1997) and the "OpenGL Specification," version 1.1 (1997), all of which are hereby incorporated by reference in their entirety. However, as one skilled in the relevant art will find apparent, graphics library API 108 may be any other proprietary or publicly available graphics library such as the commonly-available PEX (PHIGS Extension to X) library available from, for example, the X-Consortium. Graphics application 106 may be any graphics software application now or later developed that is capable of communicating with the graphics system 102 through the implemented graphics library API 108. Such graphics applications may be, for example, a database, a CAD/CAM application, an architectural design application, a civil engineering application, a word processing package, or the like.

Graphics library 104 includes a graphics library control module 112 and multiple pipeline control modules 114. Graphics library control module 112 performs well-known functions such as managing publicly visible graphics library state information and informing other components of graphics library 104 of state changes. Graphics library control module 112 performs generally graphics library functions defined by API 108 and maintains corresponding data structures that store the noted state information. Graphics library 104 may be implemented, for example, using the C programming language.

Pipeline control modules 114 perform well-known operations associated with the control of the graphics pipeline. Pipeline control modules 114 maintain derived internal graphics state information and provide such state information to device-specific modules 110 and graphics hardware 116. Operations include, for example, scheduling operators, buffering vertex API data and executing operators on primitives to generate data for rasterizers located in graphics hardware 116. These functions and operations are well known in the art.

Device-specific modules 110 provide primitive data, including vertex state (coordinate) and property state (color, lighting, etc.) data to graphics hardware 116. Graphics hardware 116 may be any well-known graphics hardware such as the Visualize FX4 Graphics System, available from Hewlett-Packard Company, Palo Alto, Calif. Computer graphics system 102 is typically a high performance workstation such as the HP Visualize Workstation also manufactured and sold by Hewlett-Packard Company. The computer graphics system preferably implements the HP-ux operating system, which is a UNIX based operating system. It will be understood that any workstation or other computer having similar capabilities may be utilized within the scope of the present invention.

B. Rendering Pipeline

Figure 1B:
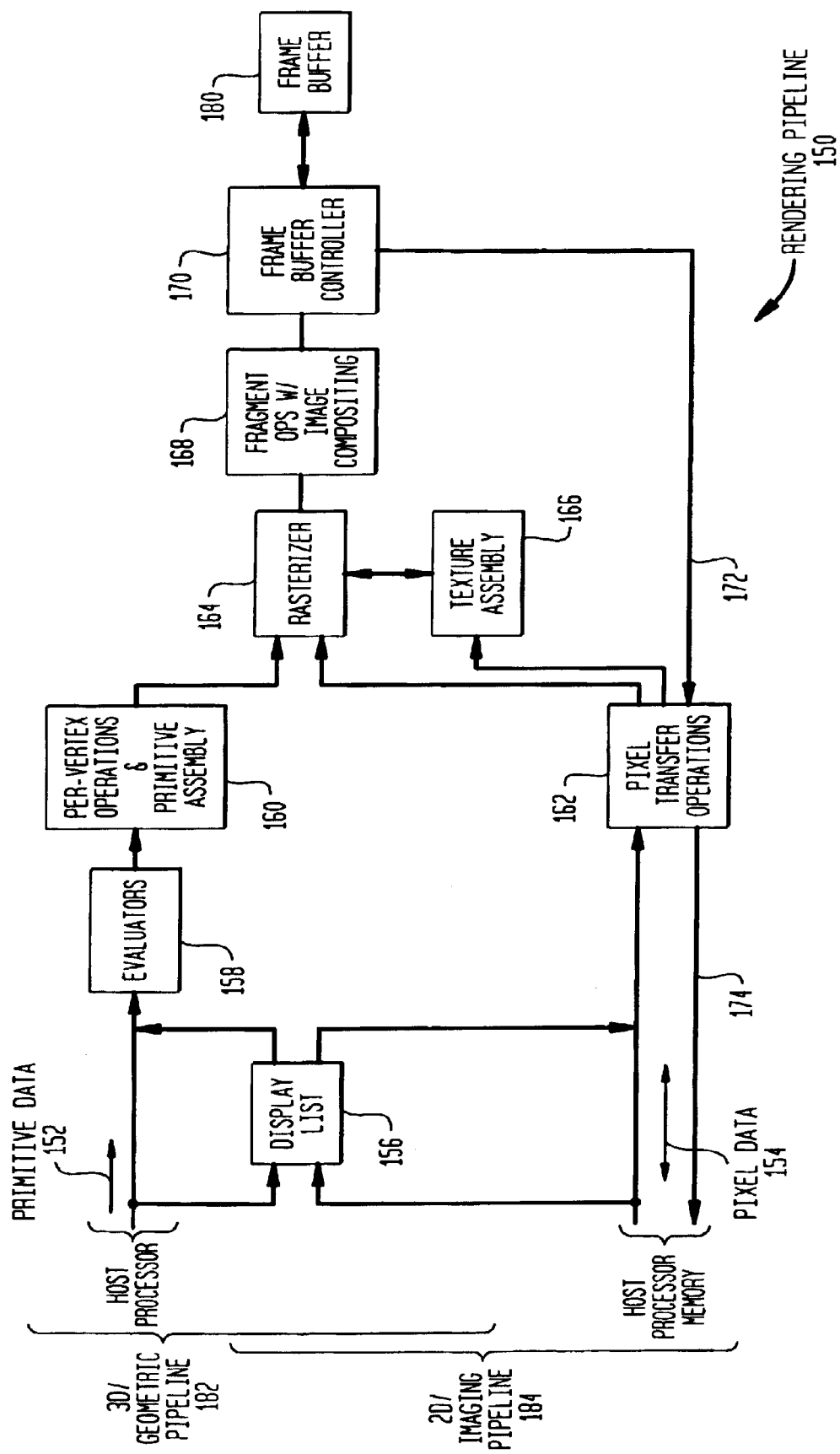
FIG. 1B is a functional block diagram of an exemplary graphics rendering pipeline suitable for incorporation of the image compositing system and methodology of the present invention.

In one exemplary graphics environment 100, graphics hardware 116, device specific modules 110 and pipeline control module 114 define a pipelined graphics architecture. FIG. 1B is a functional block diagram of a rendering pipeline 150 implemented in accordance with the OpenGL graphics library specification. Rendering pipeline 150 is commonly referred to as an OpenGL graphics pipeline or, more generally, a rendering pipeline. The present invention will be described with reference to a rendering pipeline implementation. It should become apparent to those of ordinary skill in the art, however, that the present invention may be implemented in any graphics rendering pipeline now or later developed as well as in other non-pipelined architectures.

There are two paths through rendering pipeline 150: a geometric or three-dimensional (3D) pipeline 182 and an imaging or two-dimensional (2D) pipeline 184. Geometric pipeline 182 creates a two-dimensional image from one or more model views constructed from geometric primitives defined by primitive data 152. Primitive data 152 is processed to form a two-dimensional image for display on a two-dimensional display screen. On the other hand, imaging pipeline 184 manipulates pixel data 154 representing pixels, images and bitmaps of two-dimensional images. As will be described in greater detail below, imaging pipeline 184 of the present invention performs 3D image compositing operations to composite two or more separately generated 3D images. In the illustrative embodiment disclosed herein, operational components of geometric pipeline 182 are utilized by imaging pipeline 184 to perform image compositing operations of the present invention. Thus, in the illustrative embodiment shown in FIG. 1B, geometric pipeline 182 and imaging pipeline 184 share certain stages of rendering pipeline 150. In alternative embodiments there is no components common to both pipelines.

Primitive or geometric data 152 (vertices, lines, and polygons) are transferred through the processing stages forming geometric pipeline 182 including evaluators processing stage 158 and per-vertex operations/primitive assembly processing stage 160. Pixel data 154 (pixels, images and bit maps) is processed by pixel transfer processing stage 162 of imaging pipeline 184. Thereafter, pixel data 154 and primitive data 150 are processed by rasterizer stage 164 and fragment operations stage 168. Although these latter processing stages are shared by the two pipelines 182 and 184, rasterization processing stage 164 and fragment processing stage 168 are generally disabled, other than those functions that perform imaging compositing operations of the present invention, when pixel data 154 is processed through imaging pipeline 184. Fragment operations/image compositing processing stage 168 is configured in accordance with the present invention to perform 3D image compositing operations. The other processing stages illustrated in FIG. 1B are configured in accordance with the specified OpenGL rendering pipeline as described in the "OpenGL Programmer's Guide," "OpenGL Specification," and "OpenGL Reference Manual" incorporated herein by a prior reference and are therefore discussed only briefly below.

All data, whether it represents primitives (primitive data 152) or pixels (pixel data 154) can be processed immediately in pipeline 150. Alternatively, data 152, 154 can be saved in a display list 156 for current or later use. When a display list 156 is executed, the retained data is sent from display list 156 as if it were sent by graphics application 106 to be processed immediately.

All geometric primitives are eventually described by vertices. Parametric curves and surfaces may be initially described by control points and polynomial functions. Evaluators processing stage 158 performs operations to derive the vertices used to represent the surface from the control points. One common method known as polynomial mapping can produce surface normal, texture coordinates, colors, and spatial coordinate values from the control points.

Primitive data 152 then enters the per-vertex operations and primitive assembly processing stage 160 at which the vertices are converted into primitives. Here, spatial coordinates are projected from a position in the three-dimensional world to a position on the two-dimensional display screen. In the illustrative embodiment wherein texturing is used, texture coordinates are generated and transformed in processing stage 166. If lighting is enabled, lighting calculations are performed using transformed vertex, surface normal, light source position, material properties, and other lighting information to produce a color value.

With respect to primitive assembly, processing stage 160 performs, among other functions, clipping operations. Clipping is the elimination of portions of primitive that fall outside a half-space, defined by a plane. Point clipping simply passes or rejects vertices; line or polygon clipping can add additional vertices depending on the manner in which the line or polygon is clipped. In some cases, this is followed by perspective division, which makes distant geometric objects appear smaller than closer objects. Then viewpoint and depth operations are applied. If culling is enabled and the primitive is a polygon, it then may be rejected by a culling test. The results of pixel operations processing stage 162 are complete geometry primitives, which are the transformed and clipped vertices with related color, depth, and sometimes texture-coordinate values and guidelines for rasterization processing stage 164. In the exemplary embodiment illustrated in FIG. 1B, texture assembly processing stage 166 applies texture images onto geometric objects in any well-known manner.

Pixel data 154 is first processed by pixel transfer operations processing stage 162. Pixels from system memory or frame buffer 180 are first unpacked from one of a variety of formats into the proper number of components. The pixel data is then scaled, biased and processed by a pixel map. The results are clamped and then either written into a texture memory in texture assembly 166 or sent to rasterization processing stage 164.

When pixel data 154 is read from a frame buffer 180 by frame buffer controller 170, as shown by line 172, the noted pixel transfer operations (scale, bias, mapping and clamping) are performed by pixel operations processing stage 162. These results are packed into an appropriate format and returned to an array in system memory via line 174.

Rasterization processing stage 164 is shared by geometric pipeline 182 and imaging pipeline 184. In rasterization processing stage 164, primitive data 152 is converted into fragments. Each fragment square corresponds to a pixel in frame buffer 180. Pixel data 154 is a special type of fragment with no associated depth, texture or fog components. Line and polygon stipples, line width, point size, shading model and coverage calculations to support antialiasing are taken into consideration as vertices are connected into lines or the interior pixels are calculated for a filled polygon. Color, texture, fog and depth values are assigned for each fragment square in rasterization processing stage 164.

Fragment operations with image compositing stage 168 ("fragment processing stage 168") generates pixel data to be written into frame buffer 180 by frame buffer controller 170 for subsequent rendering on a two-dimensional display screen. In fragment processing stage 168, a series of optional operations are performed that may alter or eliminate fragments. These operations, which can be enabled or disabled individually, include texturing, fog calculations, scissor testing, alpha testing, stencil testing and depth testing. Blending, dithering and masking operations follows these tests. All of these operations are considered to be well known in the art.

In accordance with aspects of the present invention, fragment processing stage 168 includes image compositing hardware in image pipeline 184 to enable 3D images that are not rendered concurrently to be composited, thereby overcoming the noted drawback of conventional rendering and imaging pipelines. In particular, image compositing operations are performed by portions of fragment processing stage 168 not otherwise implemented in imaging pipeline 184 to enable separately generated 3D images to be composited. In this illustrative embodiment, fragment processing stage 168 utilizes available components of geometric pipeline 182 to composite 3D images. The details and operation of fragment processing stage 168 and the image compositing apparatus and method of the present invention are described in detail below.

II. Fragment Processing Stage

Figure 2B:
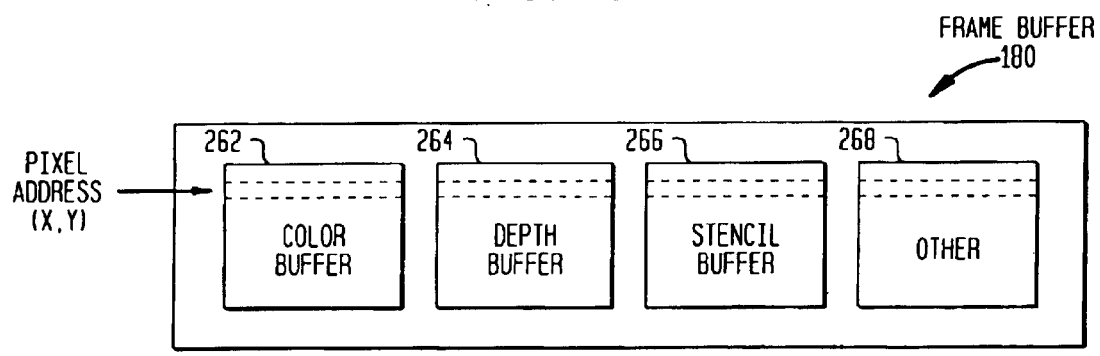
FIG. 2B is a block diagram of one embodiment of the frame buffer illustrated in FIG. 2A.
Figure 2A:
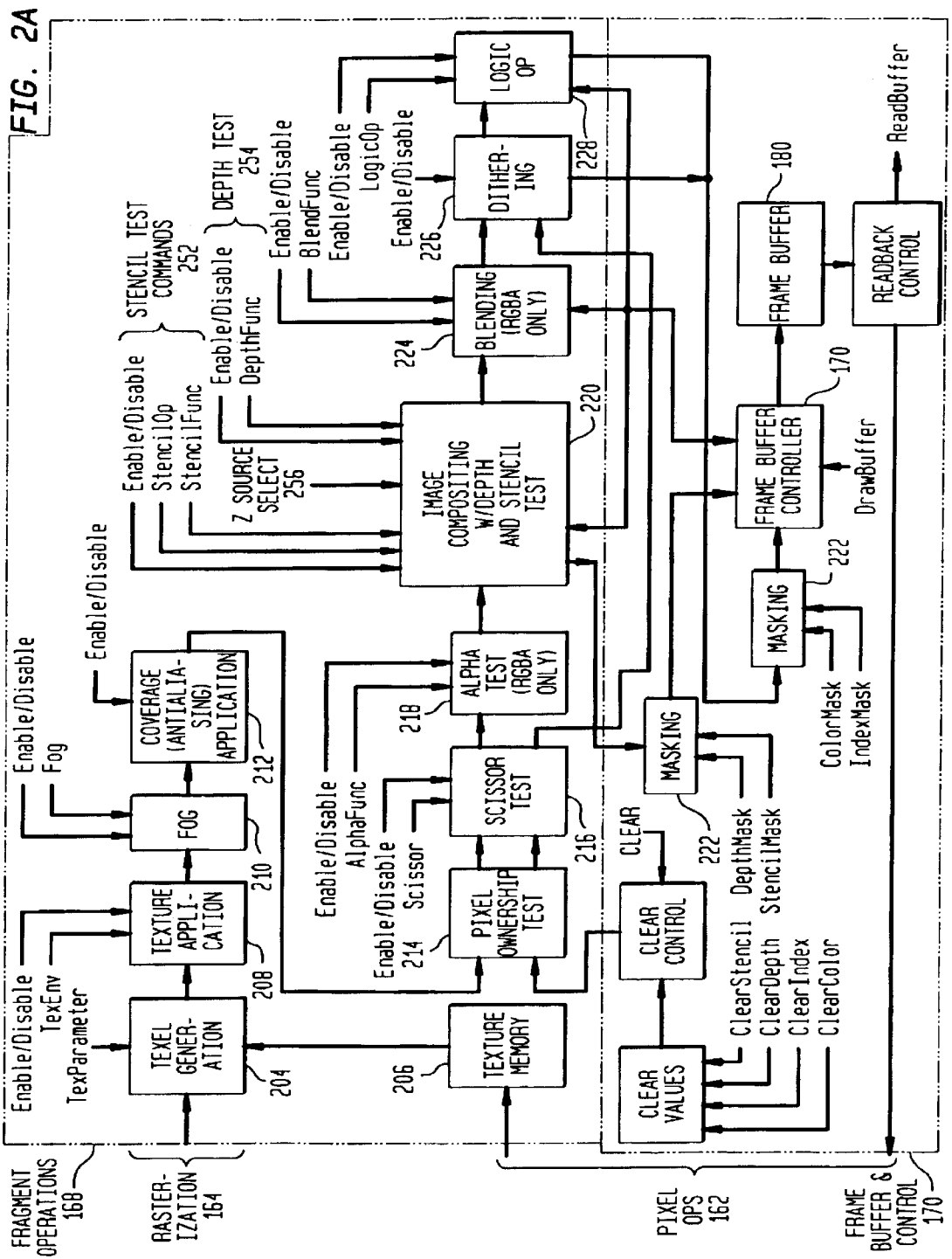
FIG. 2A is a detailed block diagram of various processing stages of the exemplary primitive and image pipelines illustrated in FIG. 1B.

FIG. 2A is a detailed system block diagram of fragment processing stage 168 configured in accordance with one embodiment of the present invention, along with frame buffer and control processing stage 170. Both of these processing stages were introduced above in the illustrative OpenGL graphics processing pipeline 150 shown in FIG. 1B. As is well-known in the art, the prior processing stages perform numerous calculations to rotate, translate and scale an object, determine the lighting and perspective of the object, determine which pixels in the display window are effective, and determine the colors of those pixels. These prior processing stages result in the determination of where an individual fragment is to be generated and the color, depth, texture and fog of that fragment. Fragment processing stage 168 contains a number of operational modules which together determine how and whether each fragment is drawn as a pixel into frame buffer 180. The operational modules illustrated in FIG. 2A, with the exclusion of the operational modules and control/data flow lines associated with the present invention, perform operations in accordance with the OpenGL specification introduced above. Accordingly, these operational modules are discussed only to the extent necessary to describe the functions and operations of the present invention.

Upon receipt of the fragments from rasterization processing stage 164, the first operation that may be encountered is texturing. A texel (texture element) is generated by texel generation module 204 from texture memory 206 for each fragment and is applied to the fragment by texture application module 208. Fog calculations may then be applied at module 210. Computer images sometimes seem unrealistically sharp and well defined. An image may appear more natural by adding fog that makes the objects shade into the distance. As is well known, "fog" is a general term that describes similar forms of atmospheric effects. It can be used to simulate such atmospheric effects as haze, mist, smoke or pollution. At operational module 212, antialiasing operations are performed to make an object appear more realistic by smoothing its edges. Oftentimes nearly horizontal or nearly vertical lines appear jagged due to the line being approximated by a series of pixels that lie on a pixel grid. This jaggedness, referred to as aliasing, is reduced by the operations performed in antialiasing operational module 212.

A pixel ownership test operational block 214 enables graphics application 106 to selectively eliminate portions of the displayed image by clearing their respective buffers in frame buffer 180. A simplified block diagram illustrating those portions of frame buffer 180 pertinent to the present invention is provided in FIG. 2B. As shown therein, frame buffer 180 includes three or more buffers. These buffers include a color buffer 262, a depth buffer 264, a stencil buffer 266 and other buffers 268 such as an accumulation buffer. The size and arrangement of these buffers are considered to be well-known in the art and described in detail in the "OpenGL Reference Manual," "OpenGL Programming Guide," and "OpenGL Specification," incorporated above.

At operational block 216, a scissor test may be performed to define a rectangular portion of the video display window and restrict rendering to within that defined window. If a fragment lies inside the rectangle, it passes the scissor test. When color buffers 262 store red, green, blue and alpha color components rather than color indexes, and alpha test may be performed at operational module 218 to allow graphics application 106 to accept or reject a fragment based upon its alpha value. If enabled, the alpha test compares the incoming alpha value with a reference value. The fragment is accepted or rejected depending upon the result of the comparison. This test may be used for many applications such as, for example, implementing transparency in portions of a displayed image.

An image compositing with depth/stencil test module 220 performs depth and stencil operations in accordance with the present invention to composite 3D images processed by imaging pipeline 184. In this particular implementation, module 220 is configured to perform stencil and depth testing on specific, separately and sequentially processed components of a 3D image. Preferably, stencil and depth testing components are shared by geometric pipeline 182 and imaging pipeline 184 for cost and space efficiency. Alternatively, similar hardware components may be implemented in both pipelines 182, 184.

A stencil test may be performed at image compositing module 220. Stenciling applies a test that compares a reference value with the value stored at a pixel in stencil buffer 266. Depending on the results of the test (i.e., the comparison), the value in stencil buffer 266 is modified. Graphics application 106 may determine the particular comparison function, reference value and subsequent stencil value modification using well-known OpenGL function calls. Stenciling is typically used to restrict drawing to certain portions of the display screen and may be used, for example, to mask out an irregularly shaped region of the screen to prevent drawing from occurring within it. Other uses of stenciling include capping, achieving certain desired effects in overlapping translucent polygons, and drawing an image with a stipple pattern. In accordance with certain aspects and embodiments of the present invention, depth testing is used to determine which of two 3D images is to be rendered at each pixel in a composited image using Z coordinate data of the two 3D images. Thereafter, stenciling is used to identify which image is to be rendered at each pixel and to control subsequent writing of color data of the 3D images to frame buffer 180 based on this initial determination. For reasons described below, the initial determination (Z coordinate comparison) and subsequent selective writing of color data (stencil masking) are performed on different components (Z coordinate data and color data) of the same image during two sequential operations of the 2D imaging pipeline 184. In other words, in the pipelined architecture described herein, imaging pipeline 184 processes the Z coordinate and color data separately and sequentially.

For each pixel on the display screen, depth buffer 264 keeps track of the distance between the viewpoint and the object occupying the pixel. A depth buffer test performed by processing module 220 uses depth buffer 264 for hidden-surface elimination. If a new candidate color for a pixel appears, it is drawn only if the corresponding object is closer than the previous object with which the pixel was associated. In this way, after an entire scene has been rendered, all the objects that are not obscured by other items remain.

As noted, fragments generated from vertex data 152 that are processed through geometric pipeline 182 include depth (Z coordinate) information. Fragments generated from pixel data 154 processed through image pipeline 184 lacks Z coordinate information since the pixel data represents a 2D image (X,Y coordinate data only). As a result, pixel data 154 does not include a data channel to transport Z coordinate data. Thus, although both pixel data 154 and primitive data 152 are processed through fragment operations stage 168, conventional fragment processing stages process 3D geometric data differently than 2D image data, effectively having separate functional paths through processing stage 168. The architecture of depth and stencil operations stage 220 is described below, followed by a description of the techniques implemented by the present invention to utilize imaging pipeline 184 to composite 3D images.

Once an incoming fragment has passed all of the above-noted tests, it can be combined with the current contents of color buffer 262 in one of several ways. In operational block 224, blending may be implemented to combine the incoming fragment R, G, B and α values (RGBA) with those of the pixel already stored at that location. Different types of blending operations are generally available. At operational block 226, the color resolution of an image may be improved at the expense of spatial resolution by dithering the color in the image. Finally, at operational block 228, logical operations are applied to the values of the incoming fragment and/or the values currently stored in color buffer 262. The results of the operations performed in fragment processing stage 168 are provided to frame buffer controller 170 for storage in frame buffer 180 in a manner which is well-known in the art to result in only the desired pixels being rendered in the desired color.

III. Depth and Stencil Test Module

Figure 3:
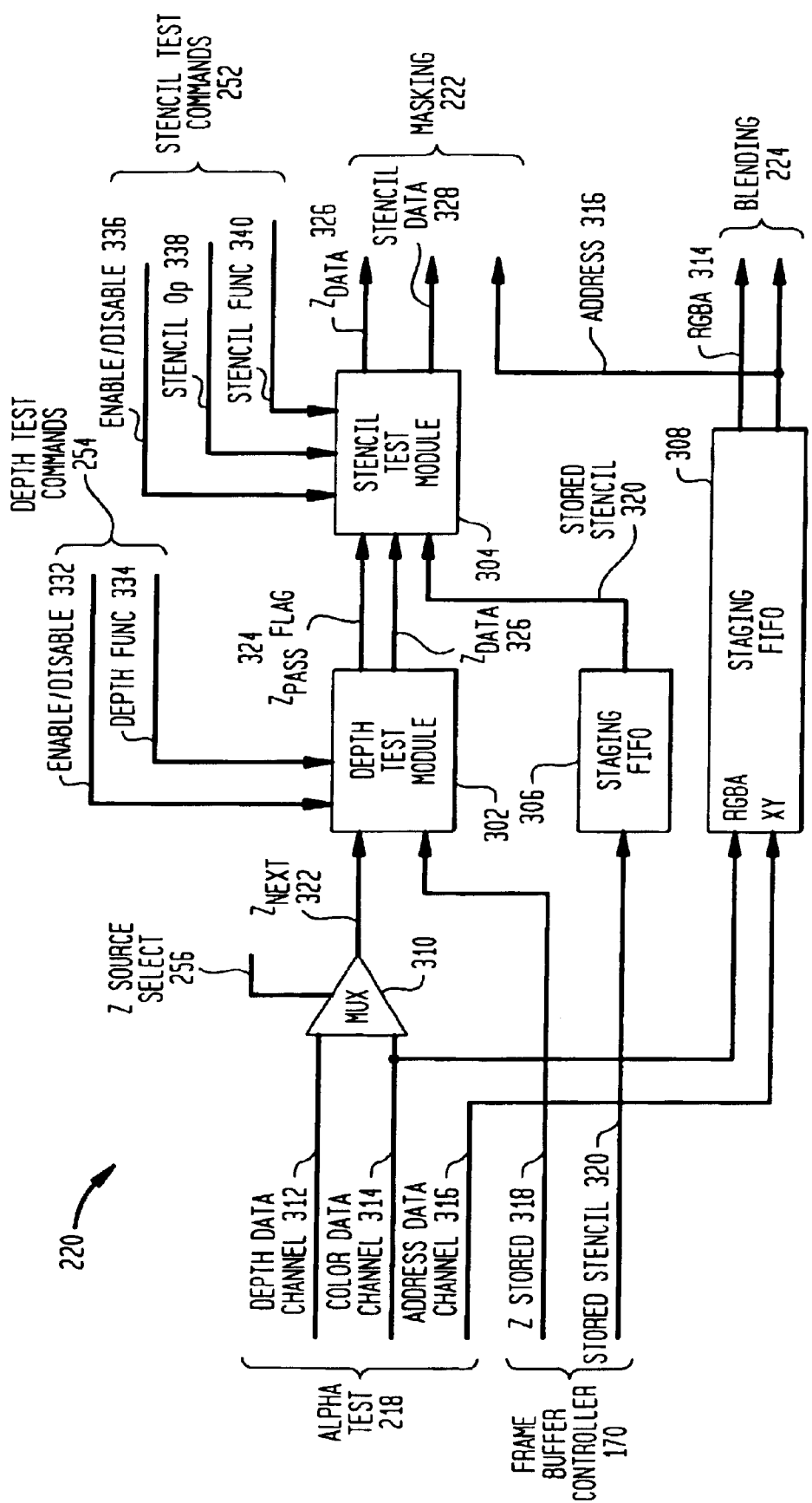
FIG. 3 is a functional block diagram of one embodiment of the depth and stencil test module illustrated in FIG. 2A.

FIG. 3 is a functional block diagram of one embodiment of depth and stencil test module 220 illustrated in FIG. 2A. In this embodiment, module 220 includes generally a depth test module 302 and a stencil test module 304. As noted, portions of geometric pipeline 182 are utilized by image compositing module 220 and, therefore, are included in the embodiment illustrated in FIG. 3. In the example shown here, the shared components are depth test module 302 and stencil test module 304.

Depth test module 302 performs depth testing operations as described above in response to depth test commands 254. Similarly, stencil test module 304 performs stencil testing operations as described above in accordance with stencil test commands 252. Commands 254 and 252 illustrated in FIG. 3 identify the OpenGL function calls that may be used to generate such commands. It should be understood that depth test module 302 and stencil test module 304 are configured to support the OpenGL specification. However, modules 302, 304 may take on any configuration now or late developed consistent with the teachings of the present invention. It should also be understood however, that any method for controlling depth/stencil operation module 220 may be used without deviating from the scope of the present invention. For ease of description, image compositing module 220 will be described with reference to two 3D images that are to be composited, a stored image that is currently stored in frame buffer 180, and a next image that is transferred through imaging pipeline 184. As such, the terminology provided herein refers to compositing only two separately generated 3D images, a stored and next 3D image. The resulting composited 3D image is stored in frame buffer 180 and is thereafter referred to as the stored image to be composited with another "next image." Thus, the functions and operations described herein with reference to a stored and next image may be repeated as needed to composite any number of 3D images.

In accordance with one aspect of the present invention, a selector 310 is implemented in module 220 to select one of two input data channels to provide Z coordinate data for the next image (Znext 322) to depth test module 302. In the illustrative embodiment, selector 310 is implemented as a multiplexer, although any implementation is possible. Specifically, multiplexer 310 receives as inputs depth data channel 312 from 3D geometric pipeline 182 and color data channel 314 from 3D geometric pipeline 182 and 2D imaging pipeline 184. Thus, Znext 322 may be provided to module 220 over depth data channel 312 or color data channel 314. Multiplexer 310 selects either of these two input data channels as the data channel which is to provide Znext 322 to depth test module 302. Multiplexer 310 is controlled by a Z source select command 256. Z source select command 256 is controlled by graphics application 106. Under circumstances in which Znext is provided over depth data channel 312, then Z source select 256 will be controlled to cause multiplexer 310 to select depth data channel 312 as the data channel that provides Znext 322 to depth test module 302. Alternatively, under circumstances in which Z coordinate data is provided over color data channel 314, Z source select 256 will then be controlled to cause multiplexer 310 to select color data channel 314 as the channel that provides Znext 322 to depth test module 302.

As noted, the Z coordinate value of the stored image, Zstored 318, is provided to depth test module 302 from frame buffer controller 170. Depth test module 302 compares Znext 322 and Zstored 318 for each pixel to determine which image, the stored image or the next image, is closest to the viewpoint. The Z coordinate value corresponding to the selected image pixel is stored in depth buffer 264 as Zdata 326. In the exemplary implementation illustrated in FIG. 3, Zdata 326 is provided to stencil test module 304 which ultimately provides it to frame buffer controller 170, as shown in FIG. 2A. Thus, for each pixel on the display screen, depth buffer 264 keeps track of the distance between the viewpoint and the object in the composited image occupying that pixel. As such, when the depth test passes, the incoming depth value, Znext 322, replaces the value currently in depth buffer 264 since the next image to be composited is closer to the viewpoint than the image currently stored in frame buffer 180. On the other hand, if the stored image is closer to the viewpoint than the next image, then Zstored 318 is provided to frame buffer controller 170 as Zdata 326. In other words, the Z coordinate for that pixel does not change.

As noted, stencil test module 304 performs stencil tests in response to commands 252 initiated by graphics application 106. Stenciling includes comparing a reference value with the values stored at a pixel location in stencil buffer 266. Depending on the result of the stencil test, the value in stencil buffer 266 may be modified. As noted, graphics application 106 can select the particular comparison function using the StencilFunc command 340, and the reference value and stencil buffer modification using the StencilOp command 338.

Stencil test module 302 receives Zpass flag 324 indicating whether the depth test performed by depth test module 302 passed; that is, whether Znext 322 is closer to the viewpoint than Zstored 318. The contents of stencil buffer 266 are provided to module 220 from frame buffer controller 170 as stored stencil 320. Initially, stored stencil 320 is stored in a staging FIFO 306 to delay advancement through the pipeline 184 during the time when depth test module 302 is performing its operations. Stencil prior 320 is provided to stencil test module 304 with Zdata 326 and Zpass 324. Based on the comparison of Znext 322 and Zstored 318 for each pixel, stencil module 304 retains the stencil value (the stored image is closer to the viewpoint than the next image) or changes the stencil value (the next image is closer to the viewpoint than the stored image).

Address data channel 316 provides the address (X,Y coordinates) while color channel 314 provides R,G,B,A color data of the pixel currently being processed by module 220 of imaging pipeline 184. Neither depth test module 302 nor stencil test module 304 require address data (X,Y) or color data (R,G,B,A) to perform their respective operations. Accordingly, the address data and color data are passed through staging FIFO 308 to be presented to blending operations module 224 when stencil test module 304 generates Zdata 326 and stencil data 328. The values in stencil buffer 266 (stencil data 328) are used by subsequent processes to either not change the color data stored in frame buffer 180 (the stored image is closer to the viewpoint than the next image) or to replace the stored color data with color data 314 (the next image is closer to the viewpoint than the stored image).

In addition, staging FIFO 308 provides address 316 to masking module 222 with stencil 328 and Zdata 326. When Zdata 326 and stencil data 328 are to be written to their respective buffers 266, 264 in frame buffer 180, the address of the pixel is required. This address is stored temporarily in staging FIFO 308 and presented to masking module 222 with stencil data 328 and Zdata 326.

As noted, module 220 is incorporated into imaging pipeline 184 to composite 3D images transferred over imaging pipeline 184. The manner in which module 220 is operated to composite 3D images is best understood by reference to the following discussion of the operational features of the present invention.

IV. Operations

A. Overview

Figure 4:
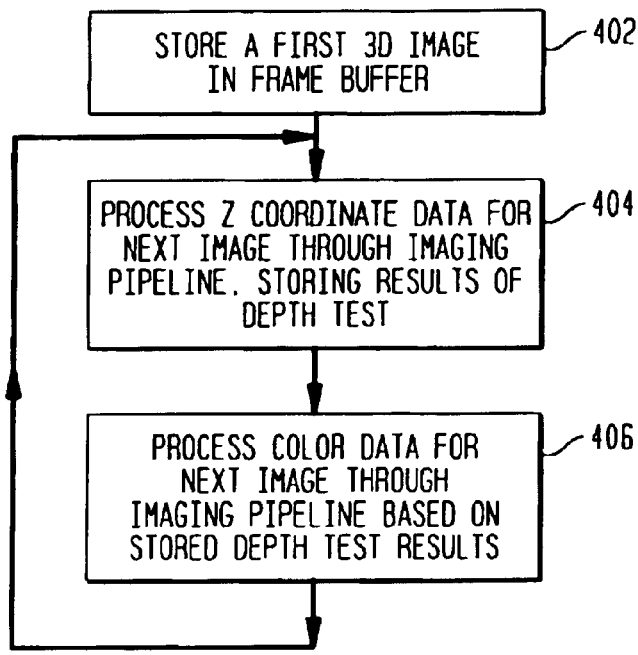
FIG. 4 is a high-level flow chart of the processes performed by one embodiment of the present invention.

FIG. 4 is a high-level flow chart of the processes performed by one embodiment of the image compositing system of the present invention. At block 402 a first 3D image is stored in frame buffer 180. As noted, the stored 3D image includes color data (R, G, B, A), address data (X, Y) and depth data (Z). This stored image may be generated using any number of known techniques. For example, the stored 3D image may be generated using geometric rendering pipeline 182 described above; that is it is an image that was rendered previously. Alternatively, the stored 3D image may be generated using some other well known technique and stored in memory, such as processor memory on the host computer. In the latter embodiment, the operations performed at block 402 include the transportation of such an image to frame buffer 180 through imaging pipeline 184. Regardless of the manner in which the stored 3D image is generated, the process of the present invention to composite a next 3D image and this stored 3D image is divided operationally into two primary operations or sub-processes represented generally by blocks 404 and 406.

In one aspect of the invention, the next 3D image is processed through imaging pipeline 184 in multiple successive data transfers. In a first data transfer, represented by block 404, the Z coordinate data for the next image is transferred through an available data channel of imaging/2D pipeline 184. To composite the next and stored images, imaging pipeline 184 performs depth testing; that is, compares the Z coordinate of each pixel of the stored image with the corresponding pixel in the next image to determine which is closest to the viewpoint. Depth buffer 264 is updated with the Z coordinate data of the pixel contained in the closest image.

The results of the depth test are recorded for subsequent use during the next data transfer described below with reference to block 406. In the aspect of the invention described herein, the recordation or retention of this information is achieved by storing the identity of the image that passed the depth test in a memory device. In the embodiment described herein wherein the implemented API 108 is OpenGL and the operator controlled pipeline configuration includes a stencil buffer, stencil buffer 266 is utilized to store such data. This is because this API provides a stencil operation that includes consideration of the depth test results, making the second operation of the invention simple to implement. Thus, in this implementation, stencil buffer 266 is modified to reflect the depth test results.

As noted, pixel data 154 does not contain Z coordinate data because 2D images require only color data and address data of each pixel in the image. As a result, imaging pipeline 184 does not provide for the transfer of Z coordinate data. That is, the Z coordinate data, which is commonly 24 bits but is at times 16 bits and can be as large as 32 bits in length, is not provided as a data transfer channel through imaging pipeline 184. In one aspect of the invention, the Z coordinate data is transferred through imaging pipeline 184 over a data channel not designed for such data. In one particular example disclosed herein, color data channel 314 is used to transfer Z coordinate data. Color data channel 314 is designed to transfer, for example, 8 bits each of R, G, B, and A data for a total of 32 bits. In such an embodiment additional components are provided to enable color data channel 314 to be selectively routed to depth test module 302. Thus, for the first data transfer, the color data is not transferred by graphics application 106. To avoid storing Z coordinate data in color buffer 262, write operations to color buffer 262 are inhibited. Upon the completion of this first data transfer operation, stencil buffer 266 reflects which image is closest to the viewpoint and, therefore, should be rendered. Depth buffer 262 includes the resulting Z coordinate value corresponding to the selected image. That is, depth buffer 262 indicates the distance from the viewpoint of the closest image.

At block 406, the second transfer of image data occurs. Here, the color data for the next image is transferred through image/2D pipeline 184 and processed so as to update color buffer 262 in accordance with the closest image information stored in stencil buffer 266. The depth test is disabled since it was performed in the first data transfer operation, and stencil test is set to pass only when the value in stencil buffer 266 indicates that the depth test passed. This results in only the color data being written to color buffer 262 for those pixels for which the second image is closer to the viewpoint than the image stored previously in frame buffer 180.

B. Coordinate Data Transfer

Figure 5A:
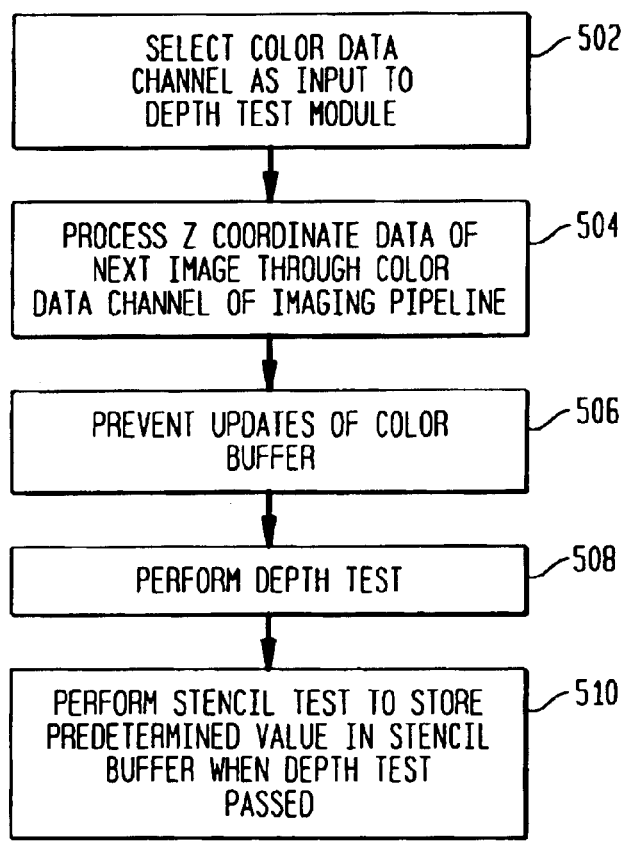
FIG. 5A is a flow chart of the processes performed by one embodiment of the present invention to process Z coordinate data.

FIG. 5A is a flow chart of the processes performed by one embodiment of the image compositing system of the present invention to perform the process introduced above with reference to block 404 of FIG. 4. As noted with reference to block 404, the Z coordinate data for the next image (Znext) is transferred through imaging/2D pipeline 184 to determine whether the stored image or the next image is closest to the viewpoint and to store the corresponding Z coordinate value in depth buffer 264.

At block 502 color data channel 314 is selected by graphics application 106 as the source for Znext 322 for processing by depth test module 302. This provides the processing path through 2D imaging pipeline 184 to perform depth testing on the stored and next 3D images. Once a data path is established for pixel data 154 to image compositing module 220, the Z coordinate data for the next 3D image is transferred by graphics application 106 over color data channel 314 at block 504.

At block 506, Writes to color buffer 262 are masked to prevent Z coordinate data from being written to color buffer 262. This is due to the use of the color data channel as the mechanism for routing Z coordinate data to module 220. Typically, data received over color data channel 314 is color data that is ultimately written to color buffer 262. Since color data channel 314 is being used for a different purpose in accordance with the present invention, the normal operations for writing the data to color buffer 262 are inhibited or masked.

Depth testing is then performed at block 508 with the corresponding update of depth buffer 262. Finally, at block 510, the stencil test is performed such that stencil buffer 266 is modified to reflect whether the depth test passed or failed. Thus, as noted, upon the completion of this first data transfer operation, stencil buffer 266 reflects whether the stored or next 3D image is closest to the viewpoint, while depth buffer 262 includes the resulting Z coordinate value corresponding to the selected image.

C. Exemplary Implementation of Coordinate Data Transfer Using OpenGL

Figure 5B:
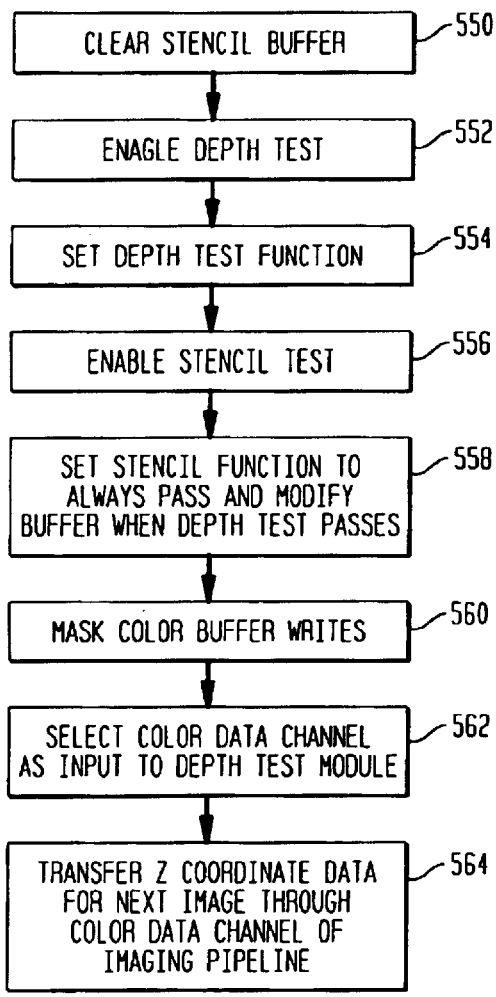
FIG. 5B is a detailed flow chart of the processes performed by one embodiment of the present invention to process Z coordinate data of a stored and next image to be composited with each other.

FIG. 5B is a detailed flow chart of the processes performed by one embodiment of the image compositing system of the present invention to transfer Z coordinate data for a next image (Znext) through improved imaging/2D pipeline 184 and to perform depth testing with the stored image. This process was introduced above with reference to block 404 of FIG. 4. The data processing operations described above with reference to FIG. 5A address the operations that were performed as the particular portion of the next image data (Z coordinate data) is processed by imaging pipeline 184. To configure imaging pipeline 184 to perform the disclosed operations requires a sequence of commands to be sent to imaging pipeline 184 before the image data is transferred. The following description addressed the operations performed at block 404 of FIG. 4 from this perspective. Particular reference will be made to OpenGL API function calls that can be implemented to control imaging pipeline 184.

Referring now to FIG. 5B, At block 550, stencil buffer 266 is cleared. Referring to the exemplary OpenGL graphical library API 108, two related function calls are provided to enable graphics application 106 to clear stencil buffer 266. First, the value to which stencil buffer 266 is to be cleared may be specified or a default value will be used. The OpenGL function call provided to set the clear value is:

void glClearStencil(GLint s)

Here, the integer value, s, to which stencil buffer 266 is cleared is zero (0), resulting in the function call:

void glClearStencil(0)

Once the clear value is specified, stencil buffer 266 must be identified as one of the buffers that is to be cleared. The function call provided to clear one or more specified buffers is:

void glClear(GLbitfield mask)

The argument mask is a bitwise-ORed combination of a selected one or more of the following values: GL_COLOR_BUFFER_BIT; GL_DEPTH_BUFFER_BIT; GL_ACCUM_BUFFER_BIT; and GL_STENCIL_BUFFER_BIT. This two-function call protocol is designed to enable multiple buffers to be cleared with a single glClear( ) function call. For example, the desired clear values for multiple buffers can be set with a series of function calls followed by a single glClear( ) function call identifying all the buffers that are to be cleared. This parallel clearing of buffers can save considerable time since writing such a significant number of values to a buffer can be time consuming.

Here, this function call clears stencil buffer 266 to its current clearing value of zero (0). The function call argument mask is set to GL_STENCIL_BUFFER_BIT resulting in:

void glClear(GL_STENCIL_BUFFER_BIT)

At block 552 the depth test is enabled. Before OpenGL permits graphics application 106 to write data into an enabled buffer, a masking operation is applied to the data. A bit-wise logical AND is performed with each mask and the corresponding data to be written. The OpenGL function call that sets the mask used to control writing into depth buffer 264 is:

void glDepthMask(GLboolean flag)

In this example, the depth buffer mask is set to one to enable the depth buffer for writing. Thus, the function call is:

void glDepthMask(1)
The OpenGL function call to enable a state is:
    void glEnable(GLenum cap)
which is set to:
    void glEnable(GL_DEPTH_TEST)
to enable depth test module 302 to perform depth testing.

This is followed by the depth test function being specified at block 554. As noted, for each pixel on the display screen, depth buffer 264 keeps track of the distance between the viewpoint and the object that will ultimately occupy that pixel in the composited image. As such, when the specified depth test passes, the incoming Z coordinate value replaces the Z coordinate value already in depth buffer 264 since the next image to be composited is closer to the viewpoint than the image currently stored in frame buffer 180. The comparison function is specified by graphics application 106. The OpenGL function call provided to make such a specification is:
    void glDepthFunc(GLenum func)
The value for the argument func can be GL_NEVER, GL_ALWAYS, GL_LESS, GL_LEQUAL, GL_EQUAL, GL_GEQUAL, GL_GREATER, or GL_NOTEQUAL. The specified depth test is passed when the corresponding z coordinate value of the next image has the specified relation to the corresponding Z coordinate value currently stored in depth buffer 264. For example, if smaller Z coordinate values indicates the corresponding objects are closer to the viewpoint, the function GL_LESS would specified and the OpenGL function call would be:
    void glDepthFunc(GL_LESS)
Thus, an incoming image pixel passes the depth test if its Z coordinate value is less than the Z coordinate value already stored in depth buffer 264.

At block 556, stencil test module 304 is enabled to perform stencil tests with the OpenGL function call:
    void glEnable(GL_STENCIL_TEST)
The stencil function is set at block 558 to always pass with stencil buffer 266 being updated only when the depth test passes. As noted, stenciling applies a test that compares a reference value with the value stored at a pixel location in stencil buffer 266. Depending on the result of the test, the value in stencil buffer 266 may be modified. OpenGL API 108 provides the following two function calls to enable graphics application 106 to select the particular comparison function used, the reference value and the modification to be performed on the stencil buffer value.
    void glStencilFunc(GLenum func, GLint ref, GLunit mask)
The value of reference argument ref is compared with the value in stencil buffer 266 using the comparison function func, with the comparison only being performed on those bits where the corresponding bits of mask are 1. The argument func can be set to any one of the following values: GL_NEVER, GL_ALWAYS, GL_LESS, GL_LEQUAL, GL_EQUAL, GL_GEQUAL, GL_GREATER and GL_NOTEQUAL. Using a default value as an example, if the comparison function is GL_LESS, then the next image passes if ref is less than the value in stencil buffer 266.

To make the stencil test always pass, the argument func is set to GL_ALWAYS and the ref and mask arguments, therefore, have no significance. As such, they are depicted below as "xx" (don't care). This results in the stencil test passing regardless of the relation between the reference value and the current stencil value. The function call, then, is:
    void glStencilFunc(GL_ALWAYS, xx, xx)

The manner in which the value in stencil buffer 266 is modified when the next image passes or fails the stencil test is determined by the OpenGL function call:
    void glStencilOp(GLenum fail, GLenum zfail, GLenum zpass)
The function specified by the fail argument applies if the next image fails the stencil test. If the next image passes the stencil test, then either the function zfail or zpass is applied depending on whether the depth test passed. The three functions fail, zfail and zpass can be GL_KEEP, GL_ZERO, GI_REPLACE, GL_INC, GL_DECR or GL_INVERT, corresponding to, respectively, keeping the current value, replacing the current value with zero, replacing the current value with the reference value, incrementing the current value, decrementing the current value and bitwise inverting the current value.

Since the stencil test was set to always pass in the glStencilFunc function call above, the first argument, fail, is a condition which will never be satisfied.

Accordingly, the value for that argument is depicted as the "don't care" value "xx". Thus, stencil buffer 266 will be modified to reflect the success or failure of the depth test. This, as noted, utilizes the stencil buffer 266 to reflect the results of the depth test performed at block 508. The OpenGL function call, then, is:
    void glStencilOp(xx, GL_KEEP, GL_INCREMENT)
This causes stencil buffer 266 to keep the current value (0) if the depth test fails and increment the current value (from 0 to 1) if the depth test passes.

At block 560 the writes to color buffer 262 are masked. The OpenGL function call provided to mask color buffer 262 is:
    void glColorMask(GLboolean red, GLboolean green, GLboolean blue, GLboolean alpha)
The red, green, blue and alpha arguments control whether the corresponding color component is written to color buffer 262. GL_TRUE enables writing to color buffer 262 while GL_FALSE does not. To prevent all writes to color buffer 262, then, this function call is:
    void glColorMask(GL_FALSE, GL_FALSE, GL_FALSE, GL_FALSE)

At block 562 color data channel 312 is selected as the channel to provide Znext 322 to depth test module 302. As noted, the selection is made by controlling the z source select command 256 provided to depth and stencil operations module 220 in FIG. 2A. This command controls the selector, implemented as a multiplexer in FIG. 3, which selects either depth data channel 312 or color data channel 314 as the channel that provides the next Znext 322 to depth test module 302. Here, the color data channel 314 is selected.

Finally, at block 564 the Z coordinate data for the new image is transferred through imaging pipeline 184 over color data channel 314. There are a number of OpenGL function calls provided to transfer pixel data 154 through image pipeline 184, depending on whether pixel data 154 is to be read from frame buffer 180 or processor memory. In this particular example, pixel data 154 is stored in processor memory. Thus, to write pixel data 154 from processor memory to frame buffer 180, OpenGL provides the following function call:
    void glDrawPixels(GLsizei width, GLsizei height, GLenum format, GLenum type, const GLvoid *pixels)
This function call draws a rectangle of pixel data with dimensions width and height. The pixel rectangle is drawn with its lower-left corner at the current raster position. The format value indicates the kind of pixel data elements that are read (an index value or an R, G, B, or A component value). The options include: GL_COLOR_INDEX (a single color index); GL_RGB (a red color component, following by a green color component, followed by a blue color component); GL_RGBA (a red color component, followed by a green color component, followed by a blue color component, followed by an alpha color component); GL_RED (a single red color component); GL_GREEN (a single green color component); GL_BLUE (a single blue color component); GL ALPHA (a single alpha color component); GL_LUMINANCE (a single luminance component); GL_LUMINANCE_ALPHA (a luminance component followed by an alpha color component); GL_STENCIL_INDEX (a single stencil index); and GL_DEPTH_COMPONENT (a single depth component). The argument type indicates the date type of each element. The options include: GL_UNSIGNED_BYTE (unsigned 8-bit integer); GL_BYTE (signed 8-bit integer); GL_BITMAP (single bits in unsigned 8-bit integers); GL_UNSIGNED_SHORT (unsigned 16-bit integer); GL_SHORT (signed 16-bit integer); GL_UNSIGNED_INT (unsigned 32-bit integer); GLINT (signed 32-bit integer); and GL_FLOAT (single-precision floating point). Thus, the function call is to be specified by graphics application 106 to retrieve the z coordinate data from processor memory.

The Z coordinate data is processed in accordance with the configuration of imaging pipeline 184 as dictated by the above OpenGL function calls. Specifically, a depth test is performed and depth buffer 262 is updated with the Z coordinate value of the closer image. Stencil test module 304 is enabled to perform a stencil test such that all pixels are tested and pass, with the stencil buffer 266 updated to reflect the results of the depth test. As noted, the stencil buffer value for each pixel remains zero when the depth test failed or incremented to 1 when the depth test passed.

C. Color Data Transfer

Figure 6A:
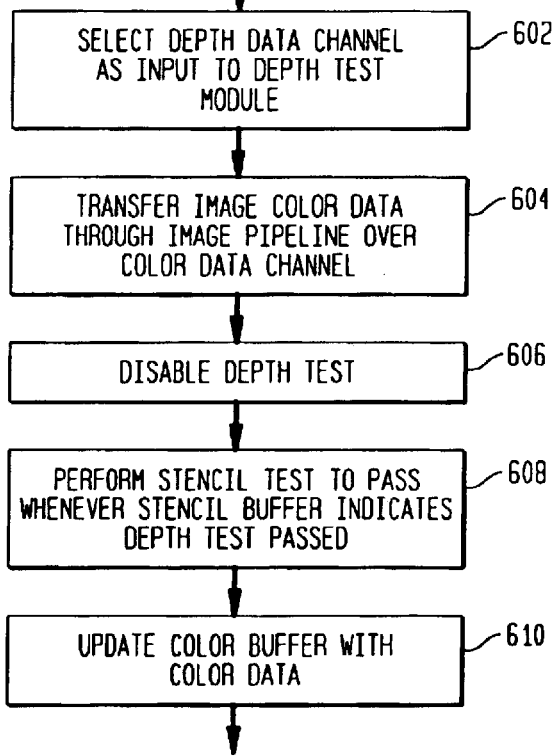
FIG. 6A is a flow chart of the processes performed by one embodiment of the present invention to process color data of a next image to be composited with a stored image.

FIG. 6A is a flow chart of the processes performed by one embodiment of the image compositing system of the present invention to perform the process introduced above with reference to block 406 of FIG. 4. As noted, at block 406, the color data for the next image is transferred through imaging/2D pipeline 184. During this process color buffer 262 is updated with the color data corresponding to the pixels of the next image that passed the depth test performed at block 404. As noted, in this exemplary embodiment, the success of the depth test is represented by the contents of stencil buffer 266.

At block 602 depth data channel 312 is selected as the channel that will provide Znext 322 to depth test module 302. This is followed by the transfer of the image color data (R,G,B,A) over color data channel 314. The depth test is disabled at block 606 since depth buffer 264 was previously updated at block 404 with the results of the depth test. The stencil test is then performed at block 608 such that the stencil test passes for each pixel of the next image that is closer to the viewpoint and, therefore, will be rendered on the display screen.

At block 610 color buffer 262 is updated. Since the stencil test was enabled, color buffer 262 is updated in accordance with the stencil as it exists in stencil buffer 266. This results in the values of color buffer 262 corresponding to pixels that passed the depth test to be updated with the color data of the next image.

E. Exemplary Implementation of Color Data Transfer Using OpenGL

Figure 6B:
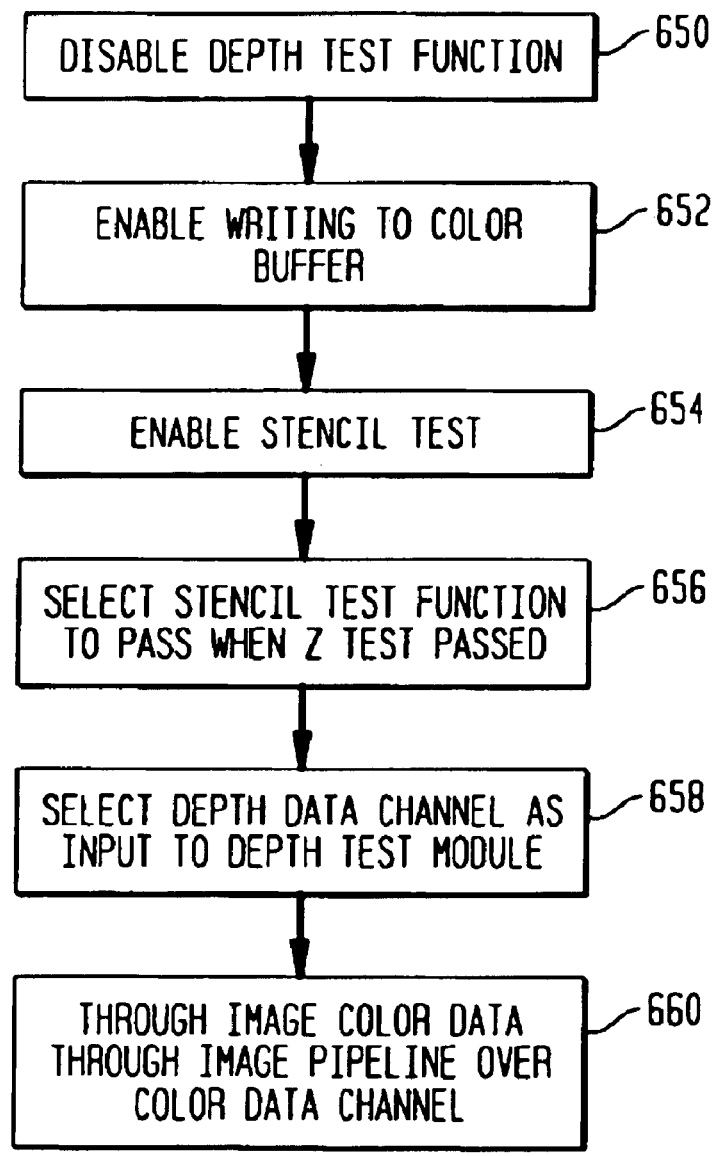
FIG. 6B is a detailed flow chart of the processes performed by one embodiment of the present invention to process color data of a next image to be composited with a stored image.

FIG. 6B is a detailed flow chart of the processes performed by one embodiment of the image compositing system of the present invention to perform the process introduced above with reference to block 406 of FIG. 4, described operationally with reference to FIG. 6A. The operations described above with reference to FIG. 6A address the operations that were performed as the particular data was transferred through imaging pipeline 184. To configure the imaging pipeline 184 to perform the disclosed operations requires a sequence of function calls to be sent to imaging pipeline 184 before data is transferred. The following discussion addressed the operations performed at block 406 of FIG. 4 from this perspective. Particular reference will be made to OpenGL API function calls that can be implemented to control imaging pipeline 184.

Referring now to FIG. 6B, at block 650 depth test is disabled. The OpenGL function call provided to disable an OpenGL state is:

void glDisable(GLenum cap)

which is set to:

void glDisable(GL_DEPTH_TEST)

to prevent depth test module 302 from performing depth testing. As noted, depth test module 302 performed depth testing of the stored and next images at block 404, including updating depth buffer 264.

At block 652 writes to color buffer 262 are enabled. The OpenGL function call provided to enable writes to color buffer 262 is:

void glColorMask(GLboolean red, GLboolean green, GLboolean blue, GLboolean alpha)

As noted, the red, green, blue and alpha values control whether the corresponding component is written to in color buffer 262. GL_TRUE enables writing to color buffer 262 to occur while GL_FALSE prevents such buffer write operations. To enable writes to color buffer 262, then, this function call is:

void glColorMask(GL_TRUE, GL_TRUE, GL_TRUE, GL_TRUE)

At block 654, stencil test module 304 is enabled to perform stencil tests. The OpenGL function call is:

void glEnable(Glenum cap)

This function call is:

void glEnable(GL_STENCIL_TEST)

to enable stencil test operations.

At block 656 the stencil test function is selected to always pass when stencil buffer 266 has a value that indicates that the depth for that pixel test passed. Processes occurring later in the pipeline read the status of the stencil test to determine whether they should be performed. As noted, stencil buffer 266 stores a zero (0) when the depth test failed and a one (1) when the depth test passed.

The OpenGL function call to enable graphics application 106 to select the particular comparison function and reference value is:

void glStencilFunc(GLenum func, GLint ref, GLunit mask)

The reference value ref is set to one (1) and is compared with the value in stencil buffer 266 using the comparison function func of GL_EQUAL, with the comparison being performed on all bits in stencil buffer 266 because none are masked by a mask value of 0xff. Thus, the function call is:

void glStencilFunc(GL_EQUAL, 1, 0xff)

The data in stencil buffer 266 need not be modified and can be set to any value this pass through imaging pipeline 184.

At block 658 depth data channel 314 is selected as the channel to provide new Znext 322 to depth test module 302. As noted, the selection is made by controlling Z source select command 256 provided to depth and stencil operations 220 in FIG. 2A. This function call controls the selector, implemented as a multiplexer in FIG. 3, which selects either depth data channel 312 or color data channel 314 as the channel that provides the Z coordinate data for the next image, Znext 322, to depth test module 302. Here, depth data channel 314 is selected.

At block 662 the color data for the new image is transferred through imaging pipeline 184 over color data channel 314. Continuing with the same example graphics application 106 will transfer pixel data 154 from processor memory using the OpenGL function call:

void glDrawPixels(GLsizei width, GLsizei height, GLenum format, GLenum format, GLenum type, const GLvoid *pixels)

This results in color buffer 262 being updated with the color data for the pixels of the next image that are closer to the viewpoint than the corresponding pixels in the stored image.

While various embodiments of the present invention have been described above, it should be understood that they have been presented by way of example only, and not limitation. Thus, the breadth and scope of the present invention are not limited by any of the above-described exemplary embodiments, but are defined only in accordance with the following claims and their equivalents.

What is claimed is:

1. A graphics system comprising a two-dimensional graphics imaging pipeline constructed and arranged to manipulate two-dimensional (2D) images represented by pixel data comprising color and X,Y coordinate data, and excluding Z coordinate data, and to composite separately generated three-dimensional (3D) images represented by pixel data comprising X,Y,Z coordinate and color data, wherein the X,Y coordinate data define horizontal and vertical dimensions of a pixel's display screen location, and wherein the Z coordinate defines an orthogonal distance from viewpoint to the image rendered at a pixel.

2. The graphics system of claim 1, wherein the graphics system comprises a rendering pipeline comprising:

a geometric pipeline constructed and arranged to generate a two-dimensional image from one or more model views represented by primitive data; and said imaging pipeline.

3. The graphics system of claim 2, wherein operational components of said geometric pipeline are utilized by said imaging pipeline to composite said separately generated 3D images.

4. The graphics system of claim 1, wherein the graphics system further comprises a frame buffer for storing pixel data to be displayed on a display device, and wherein said 3D images comprise:

a stored image stored in the frame buffer; and a next image to be composited with the stored image.

5. The graphics system of claim 4, wherein said next image is stored in a system memory.

6. The graphics system of claim 4, wherein said next image is stored in said frame buffer.

7. The graphics system of claim 1, wherein said imaging pipeline comprises:

a depth buffer configured to store Z coordinate data for each pixel in a display scene; and a depth test module constructed and arranged to compare Z coordinate data of said 3D images, and to store in said depth buffer Z coordinate data of each pixel of the 3D image that is closest to viewpoint.

8. The graphics system of claim 7, wherein for each pixel, said imaging pipeline writes to a frame buffer of the graphics system the color data of the 3D image that is closest to the viewpoint.

9. The graphics system of claim 7 wherein said depth test module receives Z coordinate data of a next 3D image to be compared with a 3D image stored in a frame buffer of the graphics system over a color data channel of the imaging pipeline.

10. The graphics system of claim 7, wherein said indication of which 3D image is closest to the viewpoint at each pixel is provided through the setting of a corresponding bit in a stencil buffer of the imaging pipeline.

11. The graphics system of claim 7, wherein said imaging pipeline further comprises:

a stencil buffer containing stencil bits for each pixel in the display scene; and a stencil test module constructed and arranged to set said stencil bits to indicate which 3D image is closest to the viewpoint based on the results of the depth test.

12. The graphics system of claim 1, wherein said imaging pipeline receives said Z coordinate data over a data channel of the imaging pipeline configured to transfer data other than Z coordinate data, and receives said X,Y coordinate data over an address data channel.

13. The graphics system of claim 12, wherein the data other than Z coordinate data is color data, and the channel provided to transfer data other than Z coordinate data is a color data channel.

14. The graphics system of claim 1, wherein the graphics system further comprises a frame buffer for storing pixel data, and wherein the 3D images comprise a stored 3D image stored in the frame buffer and a next 3D image to be composited with the stored 3D image, wherein the next 3D image is passed through the imaging pipeline twice to composite it with the stored 3D image.

15. The graphics system of claim 14, wherein in an initial pass through the imaging pipeline, a depth test is performed to determine which 3D image is to be rendered at each pixel, with an indication of that 3D image and its Z coordinate data being stored in a memory location associated with each pixel, and in a subsequent pass through the imaging pipeline, storing in the frame buffer color data of the 3D image which is to be rendered at each pixel based on the indication stored during the initial pass through the imaging pipeline.

16. A method for compositing three-dimensional (3D) images in a two-dimensional (2D) imaging pipeline configured to manipulate 2D images represented by pixel data comprising color and X,Y coordinate data, and excluding Z coordinate data, the method comprising:

storing in a frame buffer a stored 3D image including color data and X,Y,Z coordinate data;

processing in the 2D imaging pipeline Z coordinate data of a next 3D image to determine whether the stored or next 3D image is to be rendered at each pixel in a resulting composited image; and replacing said stored color data with color data of said next 3D image for each pixel at which the next 3D image is to be rendered in the composited image, wherein the X,Y coordinate data define horizontal and vertical dimensions of a pixel's display screen location, and wherein the Z coordinate defines an orthogonal distance from viewpoint to the image rendered at a pixel.

17. The method of claim 16, wherein said processing Z coordinate data comprises:

transferring Z coordinate data of the next image through an available data channel of imaging pipeline;

depth testing the stored and next images;

updating a depth buffer as necessary to store Z coordinate data of an image that is closest to a current viewpoint; and recording an indication of which 3D image is the closest image.

18. The method of claim 17, wherein said available data channel is a color data channel.

19. The method of claim 17, wherein the imaging pipeline consists of a color data channel and an address data channel, and wherein said transferring Z coordinate data comprises:

selecting a color data channel of the imaging pipeline to provide the next image Z coordinate data for the depth testing; and transferring the next image Z coordinate data over the color data channel.

20. The method of claim 19, wherein said transferring Z coordinate data further comprises:

masking data writes to the color buffer to prevent the next image Z coordinate data from being written to the color buffer.

21. The method of claim 17, wherein said recording comprises:

performing a stencil test such that a stencil buffer is modified to reflect whether the stored or next image is closest to the viewpoint.

22. The method of claim 16, wherein the imaging pipeline consists of a color data channel and an address data channel, and wherein replacing the stored color data comprises:

receiving over the color data channel the color data of the next 3D image, and storing the color data of the next 3D image when the recording step records an indication that the next 3D image is the closest 3D image.

23. The method of claim 16, wherein said storing comprises:

generating the stored image;

storing the stored image in system memory; and transferring the stored image from the system memory to the frame buffer.

24. The method of claim 16, wherein replacing the stored color data comprises:

transferring the image color data over color data channel;

performing stencil test such that the stencil test passes for each pixel of the next image that is closer to the viewpoint that the stored image; and updating the color buffer in accordance with the stencil in stencil buffer thereby resulting in values in the color buffer that correspond to pixels that passed the depth testing.

25. A method for compositing a stored and a next three-dimensional image in an imaging/two-dimensional graphics pipeline configured to manipulate two-dimensional images represented by pixel data comprising X,Y coordinate data defining horizontal and vertical dimensions of a pixel's display screen location and color data, and excluding Z coordinate data defining an orthogonal distance from the viewpoint to the image rendered at a pixel, the method comprising the steps of:

storing the stored 3D image in a frame buffer of the imaging pipeline, wherein said stored 3D image includes color data and X,Y,Z coordinate data;

processing successively potions of the next 3D image through the imaging pipeline to select which of the next or stored 3D image is closest to a viewpoint; and saving to the frame buffer color data of the selected 3D image.

26. A graphics system comprising a two-dimensional imaging pipeline configured to manipulate two-dimensional (2D) images and to composite a separately-generated three-dimensional (3D) image stored in a frame buffer, and a next 3D image, comprising, a color data channel adapted to receive Z coordinate data and color data of a next 3D image;

an image compositing module configured to perform a depth test to determine which 3D image is to be rendered at each pixel based on Z coordinate data of the next image received over the color data channel, and Z coordinate data of the stored 3D image, and to store the Z coordinate data of the 3D image to be rendered at that pixel in a depth buffer, and a stencil test to form a stencil mask identifying which 3D image is the image that is to be rendered at each pixel, wherein the imaging pipeline, in response to receipt of color data over the color data channel, updates a color buffer to have stored therein color data of the 3D image to be rendered at each pixel of the composite image.

27. The graphics system of claim 26, wherein said two-dimensional images and said three-dimensional images are represented by pixel data.

28. The graphics system of claim 26, wherein the graphics system comprises a rendering pipeline comprising:

a geometric pipeline constructed and arranged to create a two-dimensional image from primitive data; and said imaging pipeline.

* * * * *